Figure 1:
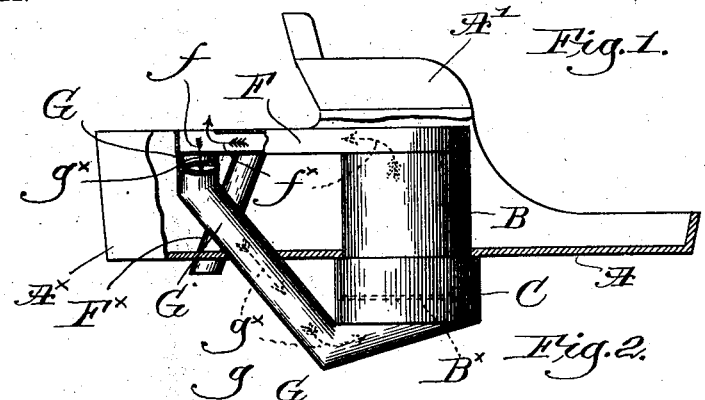

No. 721,195. PATENTED FEB. 24, 1903.
H. HOWARD.
DRAFT APPARATUS FOR PORTABLE VAPOR GENERATORS.
APPLICATION FILED JAN. 2, 1902.
NO MODEL.

Witnesses.
Thomas J. Drummond.
Adolph C. Kaiser.

Inventor.
Henry Howard,
by Crosby Gregory
Attys.

UNITED STATES PATENT OFFICE.

HENRY HOWARD, OF BROOKLINE, MASSACHUSETTS.

DRAFT APPARATUS FOR PORTABLE VAPOR-GENERATORS.

SPECIFICATION forming part of Letters Patent No. 721,195, dated February 24, 1903.

Application filed January 2, 1902. Serial No. 88,019. (No model.)

*To all whom it may concern:*

Be it known that I, HENRY HOWARD, a citizen of the United States, and a resident of Brookline, county of Norfolk, State of Massachusetts, have invented an Improvement in Draft Apparatus for Portable Vapor-Generators, of which the following description, in connection with the accompanying drawings, is a specification, like letters on the drawings representing like parts.

This invention has for its object the production of means for attaining substantially uniform draft under varying atmospheric and speed conditions for portable vapor-generators, and it is particularly adapted for automobile vehicles which derive their power from steam, also vapor, and other vapor-generators.

It is well known that the "fires" in steam-carriages are now more or less affected by the wind, particularly when the apparatus is being fired up preparatory to starting and when the vehicle is coasting, in which cases the draft is not assisted by the exhaust from the motor. Many differently-shaped outlets and inlets have been tried, some of which have been useful with the wind in certain directions; but so far as I am aware none have rendered the draft independent of the wind when running under natural draft—that is, with the wind in some directions the draft is invariably better than it is with the wind in other directions—and none of the devices heretofore devised have overcome the fundamental cause of draft in the wrong direction—*i.e.*, when there is sufficient preponderance of pressure at the outlet over that at the inlet to overcome the tendency of the heated gas and products of combustion to rise and flow through the outlet. This condition is the result of the wind blowing directly down or into the outlet and which may be partly overcome by the shape of the opening, or it may be due to another and more important cause—viz., the partial vacuum which is formed under the vehicle in a heavy wind. The latter cause frequently exists and will cause a reversed draft, no matter what the shape of the outlet above the generator. Ordinarily the burner is located in a suitable chamber beneath the generator, and fresh air is supplied to said chamber from one or more adjacent inlet-ports to support combustion, such ports receiving the supply of air from underneath the vehicle-body.

In my present invention I close the burner-chamber and supply fresh air thereto by or through one or more conduits or flues the intake-opening whereof is located in close proximity to the natural-draft outlet for the products of combustion. Intake and outlet openings are thus subjected to substantially the same atmospheric pressure entirely independent of the velocity of the wind. By this construction and arrangement both intake and outlet for the burner-chamber will experience in like degree whatever variation of atmospheric pressure may occur owing to changes in the direction and velocity of the wind. As a result the natural draft caused by the heat (and velocity of gases in most burners) is not at all affected and a substantially uniform draft will be attained.

Figure 2:
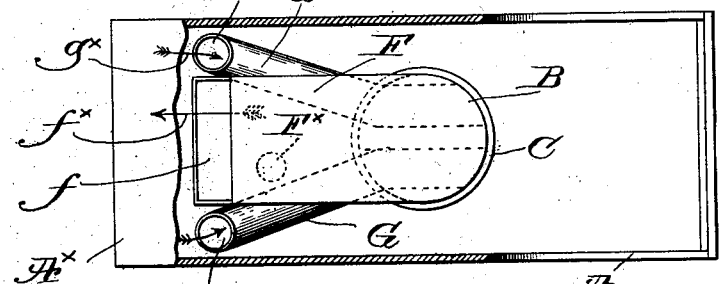
Figure 3:
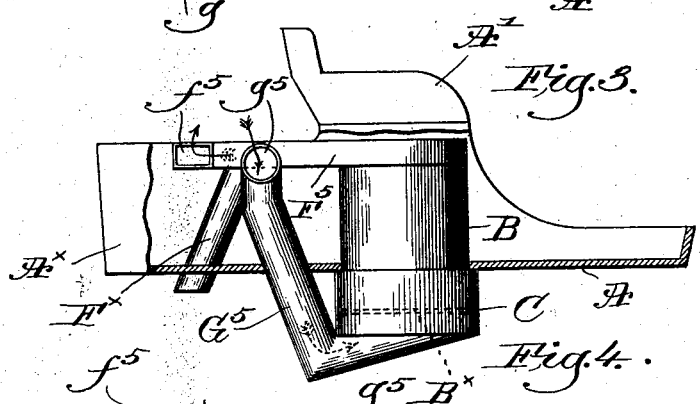

Figure 1 is a side elevation of a vapor-generator and one embodiment of my invention in connection therewith shown as applied to the body of an automobile vehicle. Fig. 2 is a top or plan view thereof, the vehicle-body being shown partly in section and broken out. Fig. 3 is a view similar to Fig. 1, but showing another arrangement embodying my invention; and Fig. 4 is a plan view of such arrangement.

I have for convenience illustrated my invention in connection with the vapor-generator of an automobile of a well-known type, the boiler or generator B being supported in vertical position beneath the seat A' of a body A. The burner B$^\times$, (merely indicated by dotted lines, Figs. 1 and 3,) of any suitable construction, is also contained within a closed burner-chamber C at the bottom of the generator, the latter in Figs. 1 and 2 having an escape-flue F for the products of combustion leading from the top of the generator and having its natural-draft-exit opening *f* at the top of the boot A$^\times$, the downturned branch F$^\times$ of the flue being used when the motor-exhaust is permitted to escape into the flue F to aid or create draft. Fresh air is supplied to the burner-chamber and burner by one or more flues or conduits G, two being shown, communicating with the closed bottom of the chamber C and having their intakes or inlets $g$ located in close proximity to the upper outlet $f$, and for this purpose the flues G are shown as carried up to the top of the boot $A^\times$ at the opposite ends of the outlet $f$.

In Figs. 1 and 2 arrows $g^\times$ indicate the direction of fresh air and arrows $f^\times$ the direction of the heated gases and products of combustion, which escape at $f$. Manifestly from the close proximity of the openings $f$ and $g$ they will be subjected to the same atmospheric pressure, and variations of such pressure will affect in like manner the intake and outlet independently of the wind velocity.

Figure 4:
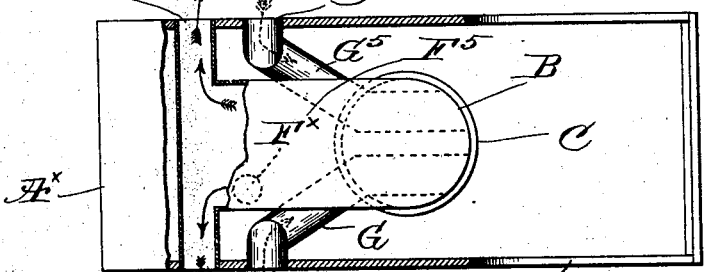

In the arrangement shown in Figs. 3 and 4 the outlet flue or conduit $F^5$ has at its exit end opposite and lateral extensions $f^5$, which pass through the sides of the boot $A^\times$, and the fresh-air conduits $G^5$ have their intakes or inlet-openings $g^5$ extended through the sides of the boot adjacent the natural-draft outlets $f^5$.

The number, shape, and size of either outlet or inlet conduits will be varied according to circumstances, and the arrangement herein shown may be modified in various ways without departing from the spirit and scope of my invention so long as the openings of the fresh-air intake and the natural-draft outlet for the burner-chamber are so arranged as to be subjected to substantially the same atmospheric pressure.

Gasolene is now used extensively as the fuel for steam-automobiles, and, as is well known, if liquid gasolene is permitted to enter the burner too rapidly so much inflammable gas is developed that it cannot all escape by the usual outlet for the products of combustion, but some will escape in sheets of flame through the air-inlet openings of the burner-chamber and rising about the body of the vehicle scorches and burns the vehicle and endangers the lives of the occupants. With my invention this very objectionable accident cannot occur, for if too much flame is developed for the combustion-outlet to take away the balance will escape through the air-inlet and from the exit-opening thereof, which latter is so located that there will be no danger to vehicle or occupant.

Having fully described my invention, what I claim as new, and desire to secure by Letters Patent, is—

1. In an automobile, the combination of a vapor-generator, a closed combustion-chamber therefor, an outlet-flue for the products of combustion provided with oppositely-discharging lateral extensions, and an air-conduit leading to the combustion-chamber, the inlets of which have the same direction relative to the prevailing air-currents as the lateral extensions of the outlet-flue.

2. In an automobile road-vehicle carrying a vapor-generator, a closed burner-chamber for said generator, an outlet flue or conduit for the products of combustion leading toward the rear portion of the vehicle and having connected lateral extensions, each provided with an exit, and fresh-air conduits having their intakes or inlet-openings adjacent the exits of the lateral extensions so that moving currents of air will act with equal pressure on both inlet and outlet currents.

3. An automobile road-vehicle carrying a vapor-generator, a closed burner-chamber for said generator, an outlet flue or conduit for the products of combustion leading toward the rear portion of the vehicle and provided with an exit at each side of the vehicle, a lateral extension or flue connecting the exits on opposite sides of the vehicle, fresh-air conduits disposed with their intake or inlet-openings on opposite sides of the vehicle and adjacent the exits of the outlet flue or conduit, said inlet-openings having the same direction relative to the prevailing air-currents as the exits of the outlet-flue.

In testimony whereof I have signed my name to this specification in the presence of two subscribing witnesses.

HENRY HOWARD.

Witnesses:
   JOHN C. EDWARDS,
   ELIZABETH R. MORRISON.